United States Patent
Kobayashi et al.

(10) Patent No.: US 6,829,103 B2
(45) Date of Patent: Dec. 7, 2004

(54) LENS BARREL

(75) Inventors: Tomoaki Kobayashi, Saitama (JP); Makoto Iikawa, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/667,427

(22) Filed: Sep. 23, 2003

(65) Prior Publication Data

US 2004/0061958 A1 Apr. 1, 2004

(30) Foreign Application Priority Data

Sep. 26, 2002 (JP) .......................... 2002-280516

(51) Int. Cl.⁷ .............................................. G02B 15/14
(52) U.S. Cl. ...................................... 359/700; 359/699
(58) Field of Search ................................. 359/694, 699, 359/700, 701, 703, 704, 823

(56) References Cited

U.S. PATENT DOCUMENTS

| | | | | |
|---|---|---|---|---|
| 4,993,815 A | * | 2/1991 | Yamazaki et al. | 359/699 |
| 5,446,593 A | * | 8/1995 | Hamasaki et al. | 359/704 |
| 5,467,227 A | * | 11/1995 | Nomura | 359/694 |
| 5,739,963 A | | 4/1998 | Kato | |
| 6,522,482 B2 | | 2/2003 | Nomura et al. | |
| 6,580,566 B1 | * | 6/2003 | Kamoda | 359/701 |

FOREIGN PATENT DOCUMENTS

JP          9-61693          3/1997

* cited by examiner

Primary Examiner—Ricky Mack
(74) Attorney, Agent, or Firm—Greenblum & Bernstein, P.L.C.

(57) ABSTRACT

A lens barrel includes a linear guide ring; a linearly movable ring which is provided inside the linear guide ring and has a cam on an outer circumferential surface; and a hand-operated rotating ring, provided outside the linear guide ring, which is capable of rotating in a circumferential direction and is incapable of rotating in an optical axis direction, with respect to the linear guide ring and which has a first penetrate groove. The linear guide ring, the linearly movable ring and the hand-operated rotating ring are provided concentrically to each other. A rotation motion of the hand-operated rotating ring with respect to the linear guide ring causes the linearly movable ring to move linearly along the optical axis direction, via the linear guide ring. The linear guide ring has a second penetrate groove penetrated in a radial direction. A projection member, which is to be engaged with the cam provided on the linear movable ring, via the second penetrate groove of the linear guide ring, is inserted from an outside of the hand-operated rotating ring.

6 Claims, 3 Drawing Sheets

LENS BARREL

BACKGROUND OF THE INVENTION

1. Field of the Invention

The present invention relates to a lens barrel in which a linearly movable ring positioned inside a stationary barrel of the lens barrel moves linearly along an optical axis by a rotation of a hand-operated rotating ring positioned around the stationary barrel.

2. Description of the Related Art

As shown in FIGS. 4 and 5, a zoom lens (zoom lens barrel) having a zoom ring (hand-operated rotating ring) 50, a linear guide ring 30 and a first lens group moving ring (linearly movable ring) 51 which are coaxially arranged in this order radially from outside to inside the zoom lens is known in the art. A set of circumferential grooves 50a are formed on the zoom ring 50 while a corresponding set of rollers 70 which are fixed to the linear guide ring 30 are respectively engaged in the set of circumferential grooves 50a to restrict the movement of the zoom ring 50 relative to the linear guide ring 30. On the other hand, a set of cam engaging portions 56 projecting in the radial direction are formed integral with an inner peripheral surface of the zoom ring 50 to engage with a corresponding set of cam protrusions 51a of the first lens group moving ring 51, respectively, via the linear guide ring 30.

According to such structure of the conventional zoom lens, the linear guide ring 30 must be provided at the front end thereof with a set of cutout portions 58 to prevent the set of cam engaging portions 56 of the zoom ring 50 from interfering with the linear guide ring 30 when the linear guide ring 30 is installed in the zoom ring 50. Such cutout portions 58 deteriorate the strength of the linear guide ring 30. Moreover, the cutout portions 58 complicate the structure of the linear guide ring 30. This makes it difficult to form the linear guide ring by injection molding.

SUMMARY OF THE INVENTION

The present invention provides a lens barrel which includes a linear guide ring serving as a fundamental element of the lens barrel, and which has a structure making it possible to form the linear guide ring easily by injection molding with an increase in strength of the linear guide ring.

According to an aspect of the present invention, a lens barrel is provided, including a linear guide ring; a linearly movable ring which is provided inside the linear guide ring and has a cam on an outer circumferential surface; and a hand-operated rotating ring, provided outside the linear guide ring, which is capable of rotating in a circumferential direction and is incapable of rotating in an optical axis direction, with respect to the linear guide ring and which has a first penetrate groove. The linear guide ring, the linearly movable ring and the hand-operated rotating ring are provided concentrically to each other. A rotation motion of the hand-operated rotating ring with respect to the linear guide ring causes the linearly movable ring to move linearly along the optical axis direction, via the linear guide ring. The linear guide ring has a second penetrate groove penetrated in a radial direction. A projection member, which is to be engaged with the cam provided on the linear movable ring, via the second penetrate groove of the linear guide ring, is inserted from an outside of the hand-operated rotating ring.

When the projection member is inserted, a length of the projection member, which is positioned in the second penetrated groove, can be substantially the same as a length of the second penetrated groove, in the optical axis direction.

It is desirable for the second penetrated groove of the linear guide ring to be provided as a circumferential elongated groove in which the projection member does not block the rotation of the hand-operated rotating ring with respect to the linear guide ring.

It is desirable for the lens barrel to serve as a zoom lens so that a desired focal length can be set freely by moving the linearly movable ring relative to the linear guide ring by a rotation of the hand-operated rotating ring.

The linear guide ring can include at least one linear guide slot extending parallel to the optical axis, and the linearly movable ring can include at least one projection which is slidably engaged in the linear guide slot.

The linear guide ring can be a stationary ring.

The present disclosure relates to subject matter contained in Japanese Patent Application No.2002-280516 (filed on Sep. 26, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
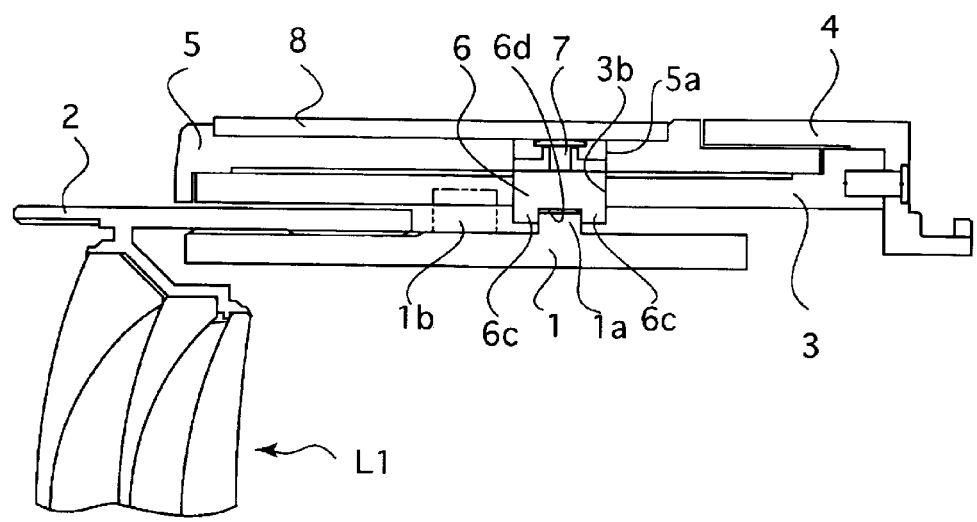
FIG. 1 is a longitudinal cross sectional view of fundamental elements of an embodiment of a zoom lens barrel according to the present invention, showing only an upper half of the zoom lens.
Figure 4:
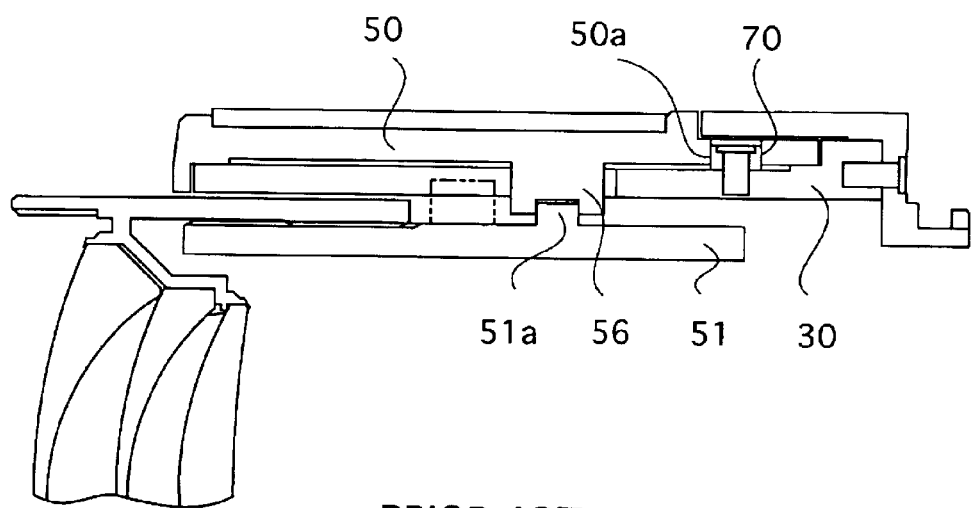
FIG. 4 is a view similar to that of FIG. 1 and illustrates fundamental elements of a conventional zoom lens barrel which is to be compared with the zoom lens barrel shown in FIG. 1.
Figure 2:
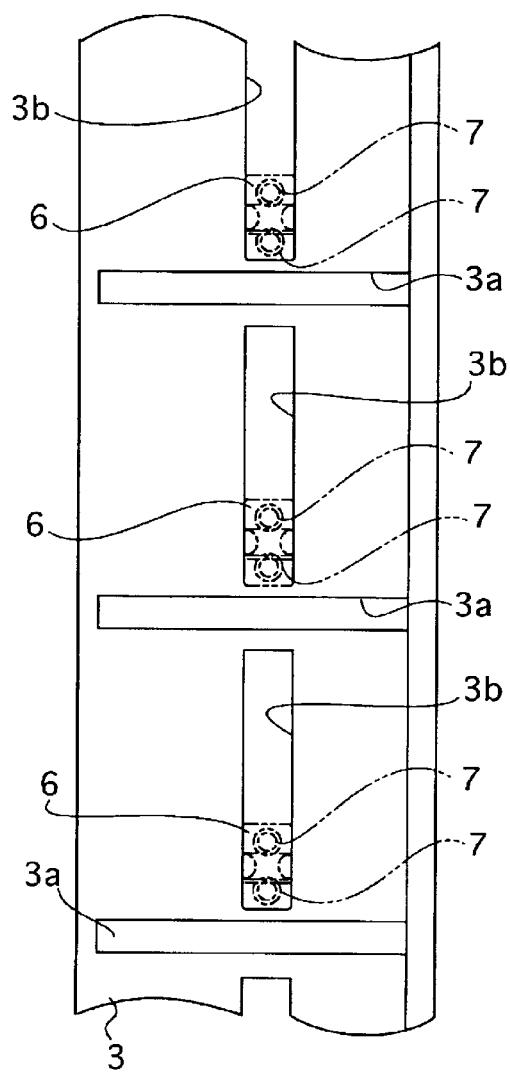
FIG. 2 is a developed view of an outer peripheral surface of a linear guide ring provided in the zoom lens barrel shown in FIG. 1.
Figure 5:
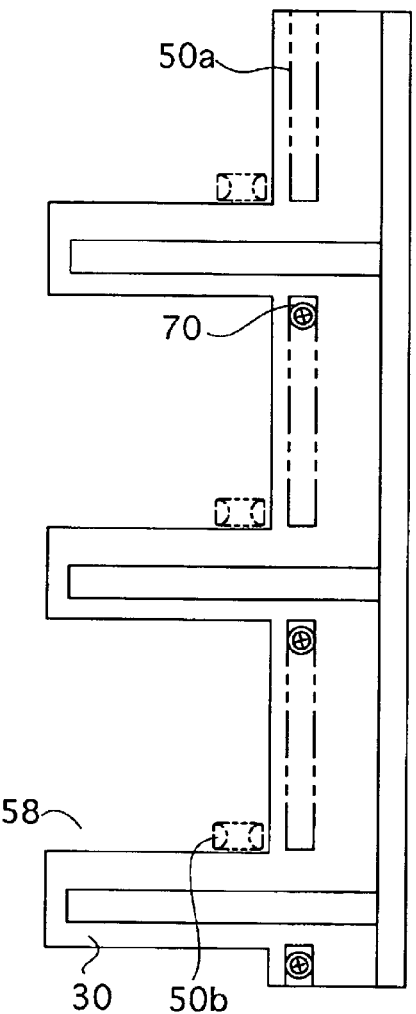
FIG. 5 is a developed view of an outer peripheral surface of a linear guide ring provided in the conventional zoom lens barrel.
Figure 3:
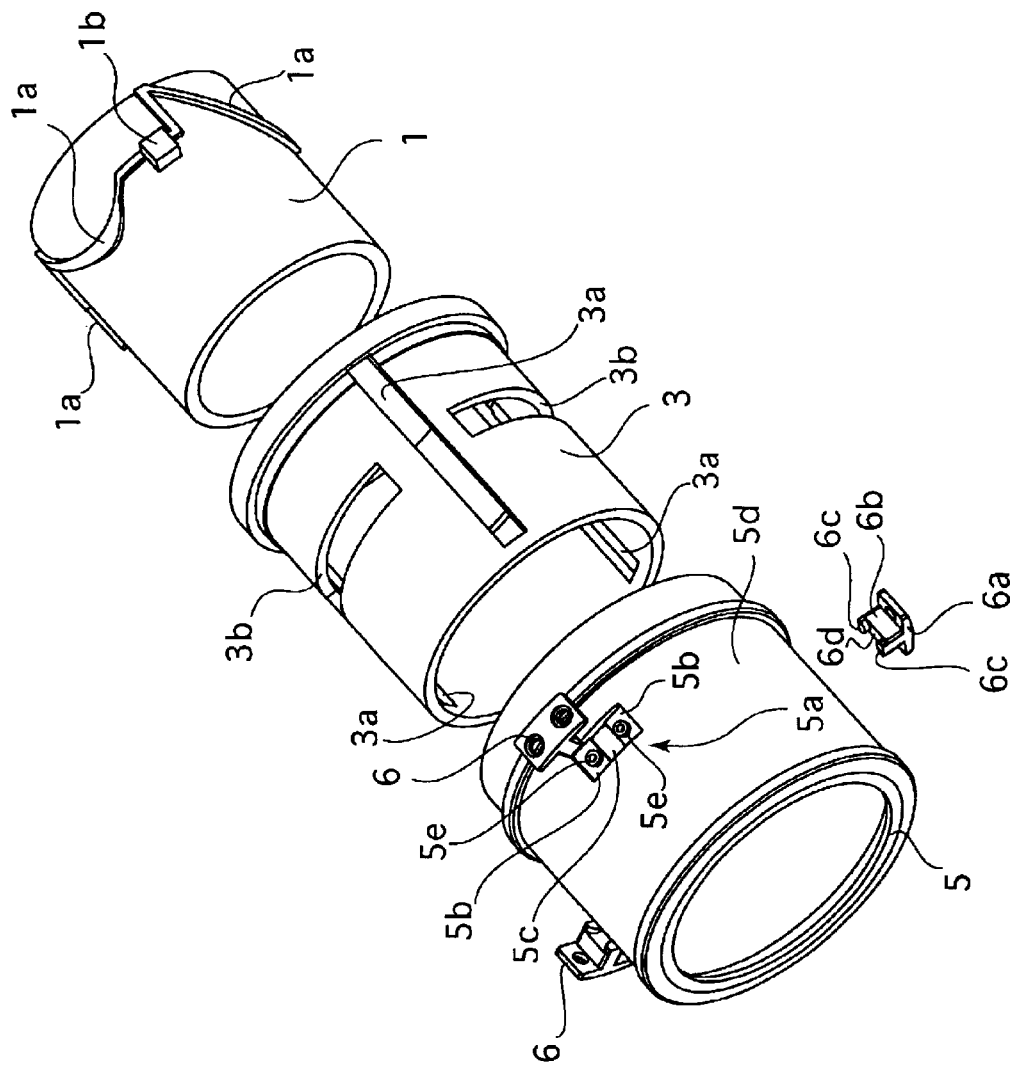
FIG. 3 is an exploded perspective view of the fundamental elements of the zoom lens barrel shown in FIG. 1.

FIGS. 1 through 3 show only fundamental elements of an embodiment of a zoom lens which are associated with the aspects of the present invention. In FIG. 1, only a front lens group (frontmost lens group) L1 is shown as an element of an optical system of the zoom lens. Namely, the zoon lens has other lens groups and components which are not shown in FIG. 1.

The present embodiment of the zoom lens is provided with a bayonet ring 4 and a linear guide ring 3, each of which is a stationary member. The bayonet ring 4 is detachably attached to a camera body (not shown). The linear guide ring 3 is fixed to the bayonet ring 4. The zoom lens is provided around the linear guide ring 3 with a hand-operated zoom ring 5 which can be manually rotated relative to the linear guide ring 3. The zoom lens is provided inside the linear guide ring 3 with a first lens group moving ring (linearly movable ring) 1 serving as a linearly movable ring which is guided linearly along an optical axis of the zoom lens without rotating relative to the linear guide ring 3. The zoom lens is provided with a front lens group support frame 2 which supports the front lens group L1. The front lens group support frame 2 is provided, on an inner peripheral surface thereof at the front end of the inner peripheral surface, with a female screw thread via which an accessory such as a filter can be screwed into the front end of the front lens group support frame 2. The first lens group moving ring 1 supports the front lens group L1 via front lens group support frame 2.

The zoom ring 5 has an annular shape so as to be positioned around the linear guide ring 3. The zoom ring 5 is provided, on an outer peripheral surface 5d thereof at regular intervals in a circumferential direction of the zoom ring 5, with three first-lens-group guiding projection (projection member) fixing portions 5a to which three first-lens-group guiding projections (projection members) 6 are fixed, respectively (see FIG. 3). Each first-lens-group guiding projection fixing portion 5a is an elongated groove which is elongated in the circumferential direction of the zoom ring 5. The opposite end portions of each first-lens-group guiding projection fixing portion 5a in the circumferential direction of the zoom ring 5 are provided with two fixing surfaces 5b each having a screw hole 5e, while a central portion of each first-lens-group guiding projection fixing portion 5a between the two fixing surfaces 5b is provided with a penetrate groove (first penetrate groove) 5c penetrating in a radical direction. The engaging projection portion 6b of each first-lens-group guiding projection 6 is fitted into the penetrate groove 5c. Each first-lens-group guiding projection 6 has a rectangular plate portion (arm portion) 6a having a substantially T-shaped cross section and an engaging projection portion 6b extending downward from the middle of the rectangular plate portion 6a, as shown in FIG. 3. Each of the three first-lens-group guiding projection fixing portions 5a is recessed (countersunk) radially inwards by a depth corresponding to the thickness of the rectangular plate portion 6a of each first-lens-group guiding projection 6 so that each first-lens-group guiding projection 6 does not project radially outwards from the outer peripheral surface 5d of the zoom ring 5 when each first-lens-group guiding projection 6 is fitted into three first-lens-group guiding projection fixing portions 5a, respectively, and the rectangular plate portion 6a is screwed and fixed. Each first-lens-group guiding projection 6 is provided at both end in the optical axis direction of the end portion of the engaging projection portion 6b thereof with a pair of follower portions (cam followers) 6c which are separate from each other to form a cam engaging surface 6d between the pair of follower portions 6c. Although there are three first-lens-group guiding projections 6 in the present embodiment of the zoom lens, the number of the first-lens-group guiding projections 6 and the number of the corresponding first-lens-group guiding projection fixing portions 5a can be one, two or more than three.

The linear guide ring 3 is provided at regular intervals in a circumferential direction of the linear guide ring 3 with three linear guide slots 3a which extend parallel to the optical axis of the zoom lens to guide the first lens group moving ring 1 linearly along the optical axis of the zoom lens without rotating the first lens group moving ring 1 with respect to the linear guide ring 3. The opposite ends of each linear guide slot 3a in the optical axis direction are formed as closed ends, and each linear guide slot 3a has a rectangular shape which is elongated in a direction parallel to the optical axis of the zoom lens. The linear guide ring 3 is further provided, along a circumference thereof at regular intervals in the circumferential direction of the linear guide ring 3, with three penetrate elongate groove (second penetrate groove) 3b in which the engaging projection portions 6b of the three first-lens-group guiding projections 6 are slidably engaged via the penetrate groove 5c of the zoom ring 5. The penetrate elongate grooves 3c extend in the circumferential direction. The opposite ends of each linear guide slot 3a in the circumferential direction of the linear guide ring 3 are formed as closed ends, and each penetrate elongate groove 3b has a rectangular shape which is elongated in the circumferential direction of the linear guide ring 3. The penetrate groove 5c of the zoom ring 5, which is formed in each first-lens-group guiding projection fixing portion 5a of the zoom ring 5, is positioned on the zoom ring 5 so that the engaging projection portion 6b of the three first-lens-group guiding projections 6 are engaged in the three penetrate grooves 3b of the linear guide ring 3, respectively, in a state where the zoom ring 5 is fitted on the linear guide ring 3 and the first-lens-group guiding projections 6 are further fitted. Although three penetrate elongate grooves 3b are provided in the present embodiment of the zoom lens, the number of the penetrate grooves 3b can be one, two or more than three as long as the number of the penetrate elongate grooves 3b corresponds to the number of the first-lens-group guiding projections 6. In addition, each penetrate elongate groove 3b does not have to be formed to be parallel to the circumferential direction of the linear guide ring 3 if the zoom ring 5 does not move in the optical axis direction relative to the linear guide ring 3 and the penetrate elongate groove 3b does not block the rotation of the zoom ring 5.

The first lens group moving ring 1 which serves as a linearly movable ring has an annular shape so as to be positioned in the linear guide ring 3. The first lens group moving ring 1 is provided on an outer peripheral surface thereof with three linearly guided projections 1b which are engaged in the three linear guide slots 3a of the linear guide ring 3, respectively, and three cam protrusions 1a, each of which are engaged with the engaging projection portions 6b of the three first-lens-group guiding projections 6 so that the pair of follower portions 6c of the engaging projection portion 6b are positioned on the front and rear sides of the associated cam protrusion 1a as shown in FIG. 1. Each cam protrusion 1a extends non-linearly on the outer peripheral surface of the first lens group moving ring 1 in the circumferential direction of the first lens group moving ring 1 and also in the optical axis direction of the zoom lens. Although there are three linearly guided projections 1b and three cam protrusions 1a in the present embodiment of the zoom lens, the number of the linearly guided projections 1b and the number of the cam protrusions 1a can be one, two or more than three as long as the number of the linearly guided projections 1b and the number of the cam protrusions 1a correspond to the number of the linear guide slots 3a and the number of the penetrate elongate groove 3b, respectively.

As can be understood from the foregoing, in the above illustrated embodiment of the zoom lens, the pair of follower portions 6c of the three first-lens-group guiding projections 6 are brought into engagement with the three cam protrusions 1a through the three penetrate groove 5c of the zoom ring 5 and the three penetrate elongate grooves 3b of the linear guide ring 3, respectively, when the three first-lens-group guiding projections 6 are respectively fixed to the three first-lens-group guiding projection fixing portions 5a from the outside the zoom ring 5 after the zoom ring 5, the linear guide ring 3 and the first lens group moving ring 1 have been put together. Since the pair of follower portions 6c, which are formed at the inner ends of the engaging projection portion 6b of each first-lens-group guiding projection 6, are engaged with the associated cam protrusion 1a to hold the associated cam protrusion 1a between the pair of follower portions 6c, a rotation of the zoom ring 5 with respect to the linear guide ring 30 causes the three first-lens-group guiding projections 6 to slidably track the three cam protrusions 1a therealong, respectively. This structure causes the first lens group moving ring 1 to move relative to the linear guide ring 30 and linearly along the optical axis of the zoom lens in a predetermined moving manner with respect to the zoom ring 5 to thereby move the first lens group L1 along the optical axis of the zoom lens via the front lens group support frame 2.

During this movement of the first lens group moving ring 1, the first lens group moving ring 1 is prevented from rotating relative to the zoom ring 5 due to the engagement of the three linearly guided projections 1b in the three linear guide slots 3a of the linear guide ring 3, respectively. Accordingly, a desired focal length can be set freely by moving the first lens group moving ring 1 by manually rotating the zoom ring 5 relative to the linear guide ring 3.

The prevent invention can be applied not only to a zoom lens such as the above illustrated embodiment of the zoom lens, but also to any other type of lens barrel.

Obvious changes may be made in the specific embodiment of the present invention described herein, such modifications being within the spirit and scope of the invention claimed. It is indicated that all matter contained herein is illustrative and does not limit the scope of the present invention.

Although the hand-operated rotating ring (zoom ring), the linear guide ring and the linearly movable ring (first lens group moving ring) are coaxially arranged in this order radially from outside to inside the lens barrel in the above illustrated embodiment of the lens barrel, it is possible that the hand-operated rotating ring, the linear guide ring and the linearly movable ring be coaxially arranged in this order radially from inside to outside the lens barrel.

As can be understood from the foregoing, according to the present invention, the engaging projection portions 6b of the hand-operated rotating ring (zoom ring 5) do not interfere with the linear guide ring 3 when the linear guide ring 3 is installed in the zoon ring, so that the linear guide ring 3 does not have to be provided at the front end thereof with cutout portions to prevent the engaging projection portions from interfering with the linear guide ring 3. This structure increases the strength of the linear guide ring, and makes it easy to form the linear guide ring 3 by injection molding. Moreover, such structure makes it easy to form other elements of the lens barrel by injection molding, thus making it possible to reduce the cost of production of the lens barrel while improving the strength of the lens barrel.

What is claimed is:

1. A lens barrel comprising:
a linear guide ring;
a linearly movable ring which is provided inside said linear guide ring and has a cam on an outer circumferential surface; and
a hand-operated rotating ring, provided outside said linear guide ring, which is capable of rotating in a circumferential direction and is incapable of moving in an optical axis direction, with respect to said linear guide ring and which has a first penetrated groove,
wherein said linear guide ring, said linearly movable ring and said hand-operated rotating ring are provided concentrically to each other,
wherein a rotation motion of said hand-operated rotating ring with respect to said linear guide ring causes said linearly movable ring to move linearly along the optical axis direction, via said linear guide ring,
wherein said linear guide ring has a second penetrated groove penetrated in a radial direction, and
wherein a projection member, which is to be engaged with the cam provided on said linear movable ring, via the second penetrated groove of said linear guide ring, is inserted from an outside of said hand-operated rotating ring.

2. The lens barrel according to claim 1, wherein when said projection member is inserted, a length of said projection member, which is positioned in the second penetrated groove, is substantially the same as a length of the second penetrated groove, in the optical axis direction.

3. The lens barrel according to claim 1, wherein the second penetrated groove of said linear guide ring is provided as a circumferential elongated groove in which the projection member does not block the rotation of said hand-operated rotating ring with respect to said linear guide ring.

4. The lens barrel according to claim 1, wherein said lens barrel serves as a zoom lens so that a desired focal length can be set freely by moving said linearly movable ring relative to said linear guide ring by a rotation of said hand-operated rotating ring.

5. The lens barrel according to claim 1, wherein said linear guide ring includes at least one linear guide slot extending parallel to said optical axis, and
wherein said linearly movable ring includes at least one projection which is slidably engaged in said linear guide slot.

6. The lens barrel according to claim 1, wherein said linear guide ring includes a stationary ring.

* * * * *